Aug. 30, 1927. A. DEWANDRE Re. 16,724
POWER BRAKE
Original Filed March 13, 1924
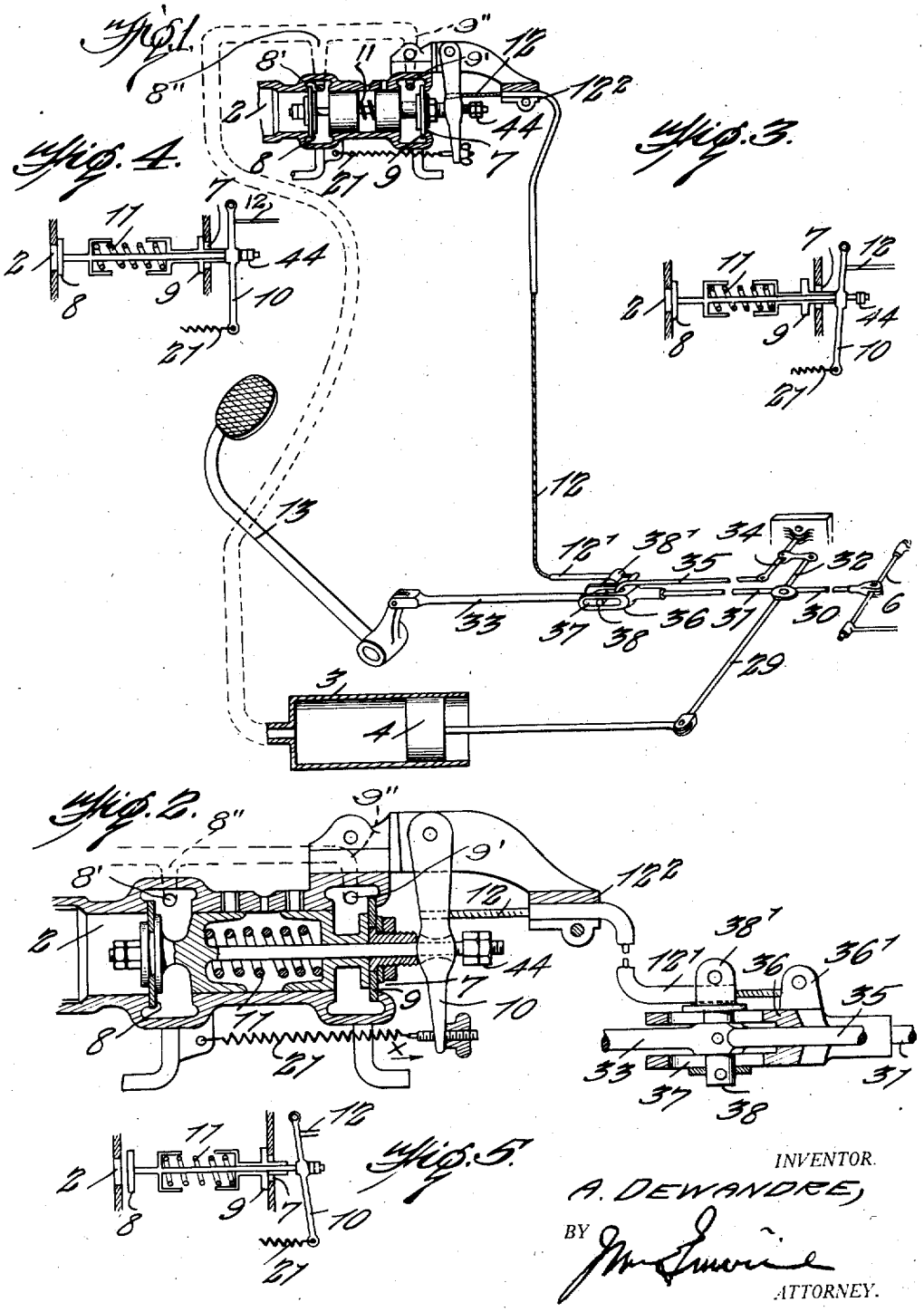
INVENTOR.
A. DEWANDRE,
BY
ATTORNEY.

Reissued Aug. 30, 1927.

Re. 16,724

UNITED STATES PATENT OFFICE.

ALBERT DEWANDRE, OF LIEGE, BELGIUM, ASSIGNOR TO SOCIETE ANONYME SERVO-FREIN DEWANDRE, OF LIEGE, BELGIUM.

POWER BRAKE.

Original No. 1,603,750, dated October 19, 1926, Serial No. 699,022, filed March 13, 1924, and in Belgium February 12, 1924. Application for reissue filed May 17, 1927. Serial No. 192,126.

This invention relates to power brakes, in which the braking force is produced by the action of the partial vacuum created by the suction of the engine and transmitted to a cylinder, in which works a piston connected to the brakes. The control of these known brakes is effected by means of a distributor, which places the brake cylinder in communication alternately with the engine suction and the atmosphere; the action of the distributor being governed by a control lever which may be either the brake pedal or a hand lever, but which, when in any position, may be further moved by an effort independent of and not counteracted by the braking action.

My invention has for its object the provision of means such that the effort for actuating the distributor increases with the braking effort on the wheels, the operator thereby being enabled to obtain an exact indication of the braking action.

According to the invention, the piston of the motor brake is connected to the brakes by suitable members which are also connected to the control lever, so that when the brakes are in action, these members exert on the said lever a reaction which is a fraction of the pressure of the brakes and which is transmitted to the operator.

In the accompanying drawing:

Figure 1 is a perspective view of one embodiment of the invention; and

Figure 2 is an enlarged detail view of a lost-motion device comprised in the connection between the control lever and the brake rodding, and the distributor with which such device is operatively associated, the parts being in the positions occupied when the brake action is being held.

Figures 3, 4, and 5, are diagrammatic views illustrating the various positions of the lost-motion device and the distributor valves.

Referring more particularly to the drawing, 3 indicates the cylinder of the brake motor, 4 the piston operatively disposed therein, and 13 the control lever (here shown as the brake pedal). The displacement of piston 4 is obtained by the partial vacuum created by the suction of the engine, in a manner similar to that disclosed in my Patent No. 1,539,166 granted May 26, 1925; such vacuum being transmitted to said cylinder by the distributor, as hereafter explained.

Referring to Figure 2, which shows the distributor in detail, it will be observed that this device comprises two valves 8 and 9, which respectively control communication of the brake cylinder 3 with the engine suction, through duct 2, and with the atmosphere through opening 7; both valves being normally pressed toward their seats by an interposed spring 11. The suction valve 8 controls suction communication with the cylinder 3 through an opening 8′ and conduit 8″, indicated in dotted lines in Figures 1 and 2, the air valve 9 controlling atmospheric admission to the cylinder through an opening 9′ and a conduit 9″ in open communication with the conduit 8″, as indicated in dotted lines in the figures referred to. The air valve 9 is mounted to slide on the stem of the suction valve 8, and is opened by being pushed to the left by a lever 10; while the suction valve 8 is opened by being pulled to the right by said lever 10 engaging an abutment 44, on the stem of the valve. The operation of this lever 10 is effected in one direction by a Bowden shaft which acts in the same way as the shaft in the patented construction, the forward end of the wire 12 being fastened to said lever at one end, while the forward end of the sheath 12′ of the shaft is secured in a fixed sleeve $12^2$ or other stationary part.

The piston 4 is connected to one end of a lever 29. Adjacent the other end 32, of lever 29, are pivotally connected the inner ends of two rods 30 and 31 that extend in opposite directions, and are themselves connected, respectively, to the brake rodding 6 and through a lost motion connection to a rod 33 actuated by and pivoted to the control lever of pedal 13. The end 32 of the lever 29 is pivotally connected by a link with a balancing lever 34, which is pivoted at one end to a fixed point on the frame, and pivoted at its other end to one end of a rod 35, whose opposite end is rigidly joined to rod 33. The outer end of the rod 31 is provided with a fork 36 (see Figures 2), the two arms of which are formed with elongated slots 37, in which may slide the ends of a cross-pin 38, secured at the junction of the rods 33 and 35. The rear end of the sheath 12′ of the Bowden shaft is attached to the head 38′ of pin 38, and the rear end of the wire 12 thereof is fastened to a lug or bracket 36′ on fork 36.

Due to the above-described arrangement, assuming the parts are at rest, as shown in Figure 3, it will be apparent that depression of the pedal will first impart an endwise forward movement to rod 33 relative to rod 31, owing to the travel of the pin 38 toward the front end of the slots 37 in fork 36; the rods 31 and 33 thus forming the two movably-related parts of a lost-motion connection. Now the pin 38 has attached to it one end of the sheath 12′ of the Bowden shaft, the other end of which is secured to the fixed point $12^2$ on the distributor, so that as a result of the increased distance between the pin-carried end of the sheath and the adjacent end of the wire 12 a force is exerted upon the wire which causes it to move lever 10 counter-clockwise in the direction of arrow X (Figure 2), whereby said lever is rocked on its pivot which permits spring 11 to first close the valve 9, as shown in Figure 4, and then lever 10 engages the abutment 44 on the stem of the suction valve 8, and opens that valve, as shown in Figure 5. This connects the brake cylinder 3 with the engine suction, with the result that piston 4 is drawn forward and pulls lever 29 in the same direction; said lever rocking about its end 32 as a fulcrum, and moving with it the rod 30, which exerts a braking effort on the rodding 6. Rod 31 is also moved in the same direction as rod 30 and, hence, decreases the distance between the fork-carried end of the wire 12 and the pin-carried end of the sheath 12′ of the Bowden shaft, so that the wire then slacks and the spring 21, connected to the distributor lever 10, moves back the latter to a neutral position, and spring 11 then acts to close the suction valve, and at the same time still hold the air valve 9 closed, as shown in Figure 4. Further depression of the pedal will have the effect of again increasing the distance between the aforesaid ends of the two parts of the Bowden shaft, so that lever 10 will open the suction valve, and a fresh braking effort will be applied to the brakes.

In the initial operative movement of the pedal 13, the rod 33, rod 35, lever 34, and end 32 of lever 29 are moved in the same direction, that is, toward the left in Figure 1. In this movement, lever 29 swings on connection with rod 30 as a center, the piston 4 moving slightly.

The operative swinging or pivotal movement of lever 29 produced consequent upon the introduction of the partial vacuum into cylinder 3, takes place about its end 32 as a support, such movement being transmitted through rod 30 to the brake rodding 6 to apply the brakes. On the continued forward movement of the piston, however, the lever 29 would tend to rock about its point of connection with the rods 30 and 31 as a fulcrum or pivot, because said lever 29 is rocking on its end 32 as a support, and such end 32 is substantially fixed by the pedal. That being so, the attempted clockwise rocking movement of lever 29, about its new fulcrum point, reacts against lever 34 exerting a pull thereon to the right in the direction of the arrow in Figure 1, and, consequently, the rod 35 and rod 33 exert on the pedal 13 an effort which increases in direct proportion with the effort exerted on the brakes and which is directed in the opposite direction to that exerted thereon by the operator. But that effort is only a fraction of the effort exerted on the brakes, so that the operator is thus enabled to obtain an accurate indication of the extent or degree of the braking action. The value of the braking action is dependent not on the position of the brake lever or pedal, but on the pressure exerted by the foot of the operator on said pedal.

When the pressure on the pedal is relieved, the pedal comes back carried by rods 33 and 35 on account of the reaction effect, said rods 33 and 35 carrying pin 38 with it to the right. This movement of said rod decreases the distance between the end of the wire 12 carried by fork 36 and the end of sheath 12′ carried by pin 38; and as a result of such decrease, the distributor lever 10 under the action of spring 21 is swung to the left or clockwise (Figure 2) so as to open the air valve 9. The cylinder 3 is thereby connected with atmosphere, and piston 4 is forced to the right by the usual return spring (not shown).

Of course, it is apparent that atmospheric valve 9 is held in normal position by the pull of spring 21, and that in this position valve 8 is closed.

What I claim is:

1. In a brake system for motor vehicles, the combination, with rodding for the brakes, of a brake cylinder; a piston in said cylinder subjected to pressure differences; a brake lever; and a connection between the piston and the brake rodding for transmitting the movement of the former to the latter, said connection being operatively related to said lever so as to exert thereon a reaction which is a fraction of the pressure of the brakes.

2. In a brake system for motor vehicles, the combination, with rodding for the brakes, of a brake cylinder; a piston in said cylinder subjected to pressure differences; a brake lever having a lost-motion connection with the rodding; and a mechanical connection between the piston and the brake rodding for transmitting the movement of the former to the latter, said connection being operatively related to said lever so as to exert thereon a reaction which is a fraction of the pressure of the brakes.

3. In a brake system for motor vehicles, the combination, with rodding for the brakes, of a brake cylinder; a piston in said cylinder subjected to pressure differences; a control lever having a positive connection with the brake rodding; a lever connected to the first lever and a mechanical connection between the piston, the rodding and the second-named lever to transmit the movement of the piston to the rodding and to exert simultaneously on the first lever, through the intermediary of the second-named lever, a reaction which is a fraction of the pressure of the brakes.

4. In a brake system for motor vehicles, the combination, with rodding for the brakes, of a brake cylinder; a piston in said cylinder subjected to pressure differences; a brake lever; and a lever system connecting the piston and the brake rodding for transmitting the movement of the former to the latter, said lever system being operatively related to the brake lever so as to exert thereon a reaction which is a fraction of the pressure of the brakes.

5. A brake system, according to claim 4, in which the lever system embodies a lever which is connected at one end to the piston and at two other points to the brake rodding and brake lever, respectively.

6. A brake system, according to claim 4, in which the lever system embodies a lever which is connected at one end to the piston, and an intermediate lever which is attached to the brake lever; the first-named lever being additionally connected at one point to the intermediate lever and at a second point to the brake rodding.

7. In a power brake system for automobiles, a manual control element, a power-actuated element, a mechanical connection between said two elements, and a brake-applying medium attached to said connection at a point intermediate said two elements, whereby the braking effort of the power-actuated element is divided in a definite proportion between the brake-applying medium and the manual control element.

8. In a power brake system for automobiles, a manual control element, a power-actuated element, a floating lever connected to both of said elements, and a brake-applying medium connected to said lever at a point intermediate its connection with said elements, whereby the braking effort of the power-actuated element is divided in a definite proportion between the brake-applying medium and the manual control element.

9. In a power operated brake system for automobiles, a power means subjected to pressure differences, a brake applying mechanism operated by the power means, a manually-operated element, a valve mechanism operated by said element for controlling said pressure differences, and means independent of said valve mechanism whereby a constant proportion of such pressure differences is transmitted to said manually-operated element in opposition to manual influence, whereby any resultant effect of such pressure differences has a fractional reaction against such manual influence to thereby indicate the effective pressure differences of the power means.

10. In a braking mechanism for automobiles, a power actuator responsive to the suction of the engine for brake application, a manually-operable element for controlling such power actuator, braking means responsive to the power actuator for applying and releasing the brakes, and means responsive to the full movement of the power actuator when operating under engine suction to exert a fractional part of such power on the manually-operated element in opposition to the manual influence thereon.

11. In a brake mechanism for automobiles, a cylinder, a piston within the cylinder, means whereby the piston may be subjected to pressure differences, a manually-operable element for controlling said means and thereby such pressure differences, connections leading to the brakes and operated by the movement of such piston, and independent means whereby the pressure differences on the piston are at all times proportionally directed to create a reaction on said manually-operable element against the manual influence.

12. In a brake system for motor vehicles, the combination of power means subjected to pressure differences, brake-applying mechanism operated by the power means, a brake lever for controlling said pressure differences, and a connection operatively related to said brake-applying mechanism and to said lever so as to exert on said lever a reaction which is a fraction of the pressure of the brakes.

13. In a brake system for motor vehicles, the combination of power means subjected to pressure differences, brake-applying mechanism operated by the power means, a brake lever for controlling said pressure differences, and an element directly and proportionally operated by the power means, said element acting to exert on the brake lever a reactive force commensurate with its operation by the power means.

14. In a brake system for motor vehicles, the combination, with rodding for the brakes, of a brake cylinder; a piston in said cylinder subjected to pressure differences; a brake lever; and means between the piston and the brake rodding for transmitting the movement of the former to the latter, said means being operatively related to the brake lever so as to exert thereon a reaction which is a fraction of the pressure of the brakes.

15. A brake system for motors, including braking mechanism, a brake cylinder having a piston connected with the braking mechanism, a valve for controlling communication of the cylinder with the suction of the engine, a valve for controlling communication of the cylinder with the atmosphere, a manually operable element, and means arranged between the manually operable element and the valve and including parts arranged for a limited free relative movement to permit the operation of the element to first close the valve controlling atmospheric admission to the cylinder and thereafter open the valve controlling suction admission to the cylinder, said means being capable of a position in which both valves are closed and incapable of a position in which both valves are simultaneously opened, and means whereby the power incident to the suction admission to the cylinder may be proportionally directed to the manually-operable element in opposition to the manual influence thereon to constitute a reaction influence on the foot of the operator proportioned relative to the braking power.

16. A brake system for motors, including braking mechanism, a brake cylinder having a piston connected with the braking mechanism, a valve for controlling communication of the cylinder with the suction of the engine, a valve for controlling communication of the cylinder with the atmosphere, a manually operable element, and a connection intermediate the manually operable element and the valves and including a lost motion part influenced by the manually operable element and by the braking mechanism, said connection, when operated by the manually operable element through the lost motion part, serving to close the valve establishing communication between the atmosphere and cylinder and thereafter open the valve establishing communication between the suction of the engine and the cylinder to move the piston to operate the braking mechanism, the operative movement of the braking mechanism serving through the lost motion part of said connection to permit closing of the valve for controlling the suction of the engine to the cylinder without affecting the previously closed valve for controlling atmospheric admission to the cylinder, the reverse movement of said manually operable element serving through said connection and the lost motion part thereof to open the valve controlling the atmospheric admission to the cylinder independently of the then position of the braking mechanism, and means whereby the power incident to the suction admission to the cylinder may be proportionally directed to the manually-operable element in opposition to the manual influence thereon to constitute a reaction influence on the foot of the operator proportioned relative to the braking power.

17. In a brake system for motor vehicles, the combination with rodding for the brakes, of a brake cylinder, a piston in said cylinder subjected to pressure differences, a manually-operable brake lever, valve mechanism operated by said lever for controlling said pressure differences and means independent of said valve mechanism whereby the power incident to the pressure differences on the piston may be proportionally directed to the brake lever in opposition to the manual influence thereon, to constitute a reaction influence on the foot of the operator proportioned relative to the braking power.

In testimony whereof I affix my signature.

ALBERT DEWANDRE.